(12) United States Patent
Kamata et al.

(10) Patent No.: US 7,457,642 B2
(45) Date of Patent: *Nov. 25, 2008

(54) INFORMATION PROCESSING DEVICE, SCHEDULE INPUTTING METHOD AND PROGRAM FOR USE IN INFORMATION PROCESSING DEVICE

(75) Inventors: Yuko Kamata, Kawasaki (JP); Susumu Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/444,327

(22) Filed: Jun. 1, 2006

(65) Prior Publication Data

US 2006/0217151 A1    Sep. 28, 2006

Related U.S. Application Data

(63) Continuation of application No. 10/655,047, filed on Sep. 5, 2003, now Pat. No. 7,133,693.

(30) Foreign Application Priority Data

Sep. 18, 2002   (JP) ............................. 2002-271259

(51) Int. Cl.
*H04Q 7/20* (2006.01)
(52) U.S. Cl. ................. 455/566; 455/432.3; 455/556.2; 340/825.66
(58) Field of Classification Search ............. 455/556.1, 455/556.2, 414.1, 502; 40/122; 340/5.63, 340/7.1, 7.21, 7.31, 7.38, 14.3, 825.68, 309.7, 340/309.9; 368/21, 47, 80; 707/203, 204; 345/157, 211, 690
See application file for complete search history.

(56) References Cited

U.S. PATENT DOCUMENTS 4,780,839 A    10/1988    Hirayama (Continued)

FOREIGN PATENT DOCUMENTS

EP          1197901         4/2002

(Continued)

OTHER PUBLICATIONS

Manual For mova F231i, Jun. 2002, pp. 166-169.

*Primary Examiner*—Jean A Gelin
(74) *Attorney, Agent, or Firm*—Staas & Halsey LLP (57) ABSTRACT

The present invention is intended to provide an information processing device adapted to rapidly register thereinto a schedule, a schedule inputting method for use in the information processing device, and a schedule inputting program used in the information processing device. The information processing device comprises: input controlling means for receiving an input; numeric value deciding means for deciding whether an inputted numeric value can be identified as a time based on the number of digits of the inputted numeric value and a value of each digit of the inputted numeric value and for identifying the numeric value as a scheduled time in the case where the numeric value is identifiable as the time; timer means for acquiring the current time; comparator means for shifting the scheduled time into the future by only a period which is spent until the scheduled time reaches the same time in the future in the case where the scheduled time is represented to be previous to the current time; and schedule management means for register the scheduled time and a predetermined schedule content as a schedule.

21 Claims, 9 Drawing Sheets

U.S. PATENT DOCUMENTS

| | | |
|---|---|---|
| 5,128,981 A | 7/1992 | Tsukamoto et al. |
| 5,220,540 A | 6/1993 | Nishida et al. |
| 5,525,958 A | 6/1996 | Negishi et al. |
| 5,859,636 A | 1/1999 | Pandit |
| 5,870,713 A | 2/1999 | Haneda et al. |
| 5,946,647 A | 8/1999 | Miller et al. |
| 6,456,841 B1 | 9/2002 | Tomimori |
| 6,522,893 B1 | 2/2003 | Han et al. |
| 6,704,606 B2 | 3/2004 | Watari |
| 2001/0006893 A1 | 7/2001 | Yoshioka |
| 2002/0032040 A1 | 3/2002 | Tsukamoto et al. |
| 2002/0059168 A1 | 5/2002 | Komai |
| 2002/0150387 A1 | 10/2002 | Kunii et al. |
| 2002/0177442 A1 | 11/2002 | Nagashima |
| 2003/0087668 A1 | 5/2003 | Lee et al. |
| 2003/0100323 A1 | 5/2003 | Tajima et al. |

FOREIGN PATENT DOCUMENTS

| | | |
|---|---|---|
| JP | 61-048676 | 3/1986 |
| JP | 02-077683 | 3/1990 |
| JP | 11-344584 | 12/1999 |
| JP | 2000-090151 | 3/2000 |
| JP | 2001-186277 | 7/2001 |
| WO | 02/25478 | 3/2002 |

INFORMATION PROCESSING DEVICE, SCHEDULE INPUTTING METHOD AND PROGRAM FOR USE IN INFORMATION PROCESSING DEVICE

CROSS-REFERENCE TO RELATED APPLICATIONS

This application is a continuation of application Ser. No. 10/655,047, filed Sep. 5, 2003, now U.S. Pat. No. 7,133,693, the contents of which are incorporated herein by reference, which claims priority to Japanese Patent Application No. 2002-271259, filed Sep. 18, 2002, the contents of which are incorporated herein by reference.

BACKGROUND OF THE INVENTION

1. Field of the Invention

The present invention relates to an information processing device adapted to manage a schedule inputted thereinto by a user for example, a schedule inputting method for use in the information processing device and a schedule inputting program used in the information processing device.

2. Description of the Related Art

Recently, as a typical example of such an information processing device, there is a portable telephone having a schedule management function. The following description is provided to explain such a portable telephone shown in FIG. 1 as an example of the information processing device.

Figure 1:
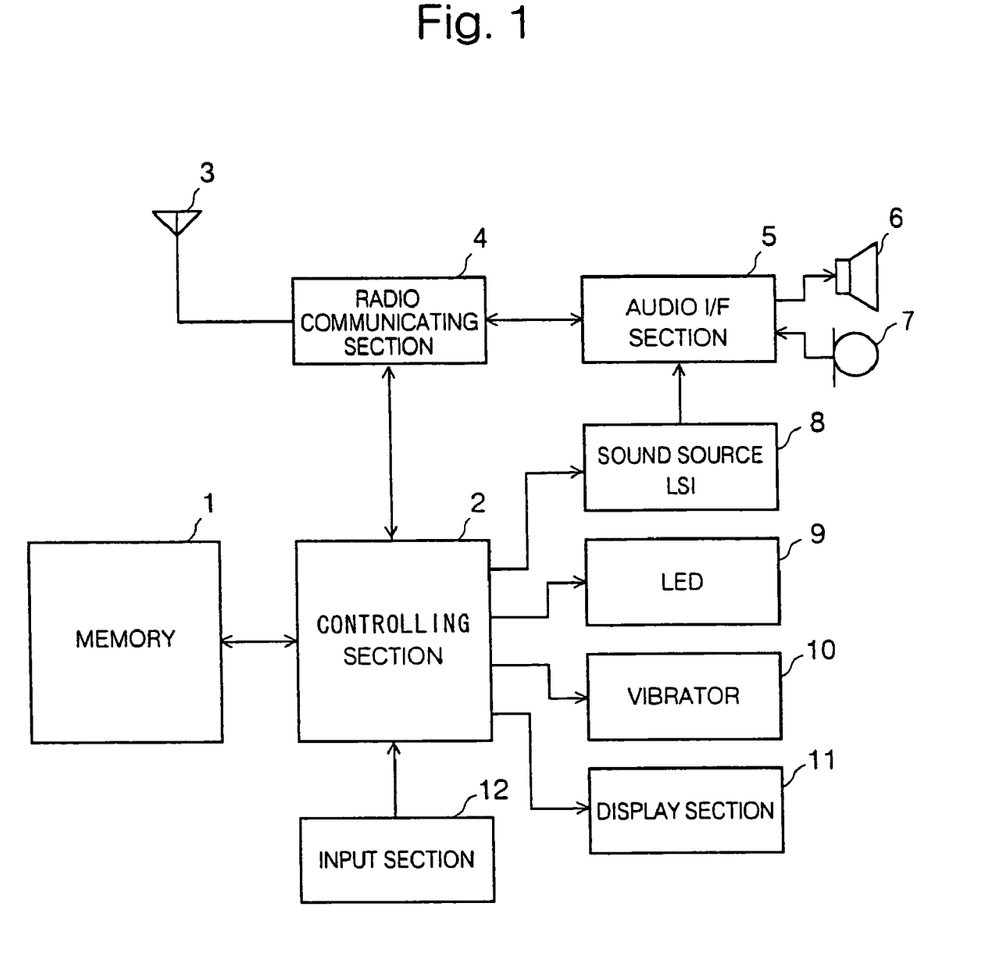
FIG. 1 is a schematic block diagram illustrating a configuration of a portable telephone.

As shown in FIG. 1, this portable telephone comprises: a memory 1; a controlling section 2; a transmitting/receiving antenna 3; a radio communicating section 4; an audio interface (I/F) section 5; a speaker 6; a microphone 7; a sound source LSI (Large-Scale Integration) 8; an LED (Light Emitting Diode) 9; a vibrator 10; a display section 11; and an input section 12.

The memory 1 previously stores therein operation programs such as a schedule management program, a communication program and a browser program and a dictionary which can be read out by the controlling section 2. The controlling section 2 is adapted to read from the memory 1 information that has been registered into the memory 1 by a user and is required for performing a schedule and an operation or to write such information into the memory 1. Thus, the controlling section 2 controls various portions of the portable telephone according to the operation programs read from the memory 1.

The radio communicating section 4 receives a radio signal from other network device via the transmitting/receiving antenna 3 according to control of the controlling section 2 and, if a content of the radio signal is an audio signal, outputs it to the speaker 6 via the audio I/F section 5 or if the content of the radio signal is a data, outputs it to the controlling section 2. Also, the radio communicating section 4 transforms a data from the controlling section 2 or an audio signal from the audio I/F section 5 into a radio signal according to control of the controlling section 2, and then transmits it to the other network device via the transmitting/receiving antenna 3. The speaker 6 outputs the audio signal as a voice outwardly from the vocal I/F section 5.

The sound source LSI 8 outputs an audio signal such as an alarm sound or incoming call sound to the speaker 6 via the audio I/F section 5 according to control of the controlling section 2. The LED 9 emits light according to control of the controlling section 2. The vibrator 10 vibrates according to control of the controlling section 2. The display section 11 performs a display of data according to control of the controlling section 2. The input section 12 receives key-inputs from the user and then outputs them to the controlling section 2.

Figure 2:
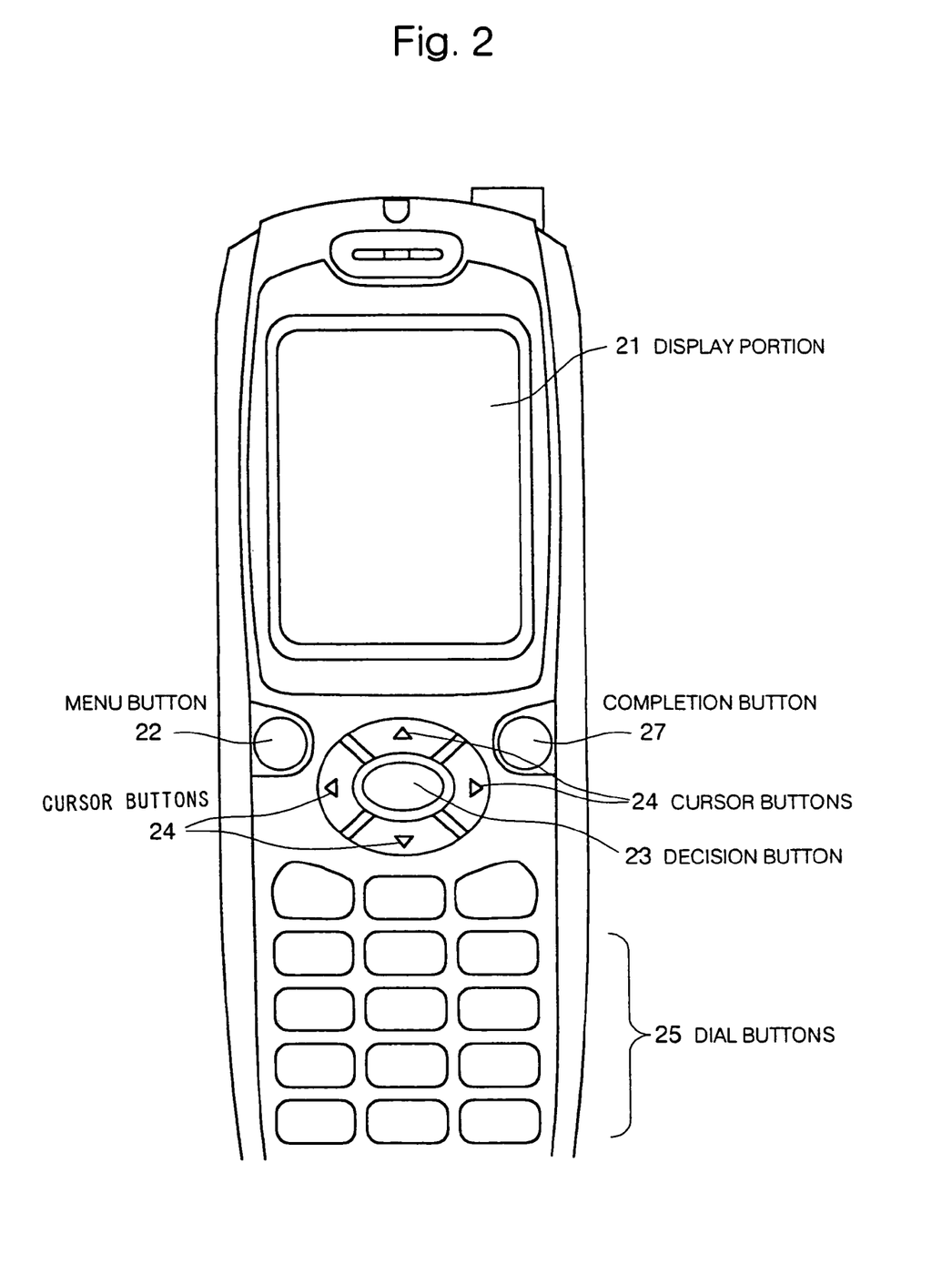
FIG. 2 is an outer appearance of the portable telephone as an example, particularly illustrating thereon its display and input portions.

The following description is provided to explain details of a display portion and an input portion of the portable telephone as shown by its outer appearance in FIG. 2. As shown in FIG. 2, this portable telephone equips with the display portion 21 capable of displaying a variety of (picture) screens. Also, the input portion comprises: a menu button 22 for opening a menu screen; a decision button 23 for deciding a selection content and/or a registration content; cursor buttons 24 for moving a cursor vertically and horizontally; and dial buttons 25 for inputting characters and/or numerals.

Figure 7:
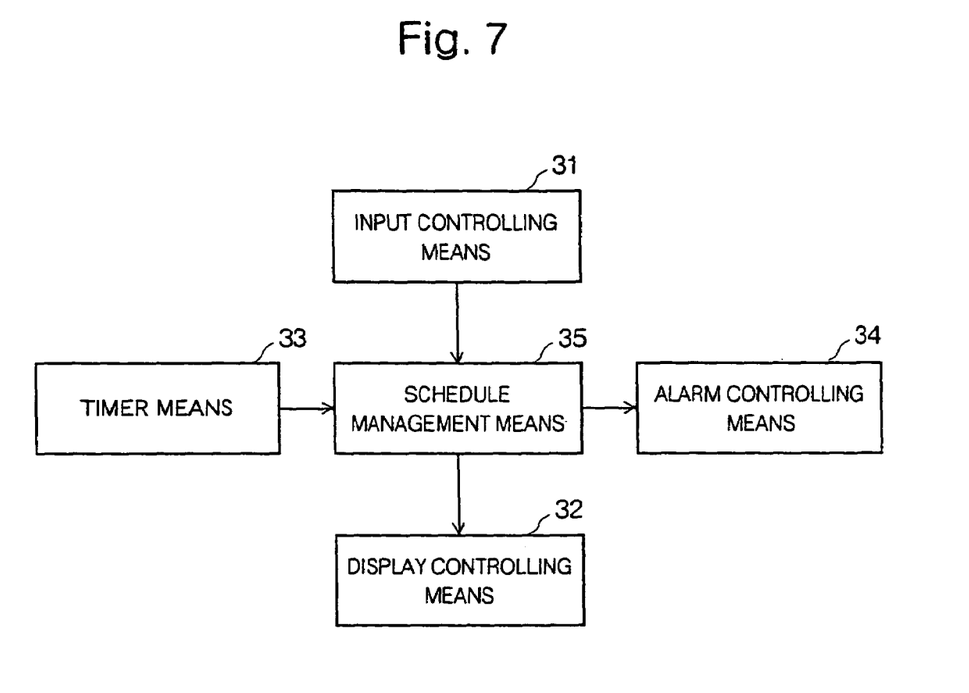
FIG. 7 is a schematic functional block diagram illustrating a schedule management program as an example which is performed in a conventional portable telephone.

The following description is provided to explain a function of a schedule management program of the portable telephone. FIG. 7 is a schematic functional block diagram showing an example of a conventional schedule management program used in the portable telephone. Input controlling means 31 receives a schedule via the input section 12 and then outputs it to schedule management means 35. Display controlling means 32 performs a display of a screen by using the display section 11 according to instructions from the schedule management means 35. Timer means 33 outputs the current time to the schedule management means 35 as needed. Alarm controlling means 34 outputs an alarm by using a combination of the LSI 8, the audio I/F section 5 and the speaker 6, the LED 9, the vibrator 10, and the display section 11 according to instructions from the schedule management means 35.

The schedule management means 35 registers the schedule obtained from the input controlling means 31 into the memory 1. Also, the schedule management means 35 outputs an instruction of the alarm to the alarm controlling means 34 when an alarming time set on the schedule becomes equal to the current time acquired by the timer means 33. Further, the schedule management means 35 outputs an instruction of a display of a registration screen and/or a registration content to the display controlling means 32.

Figure 8:
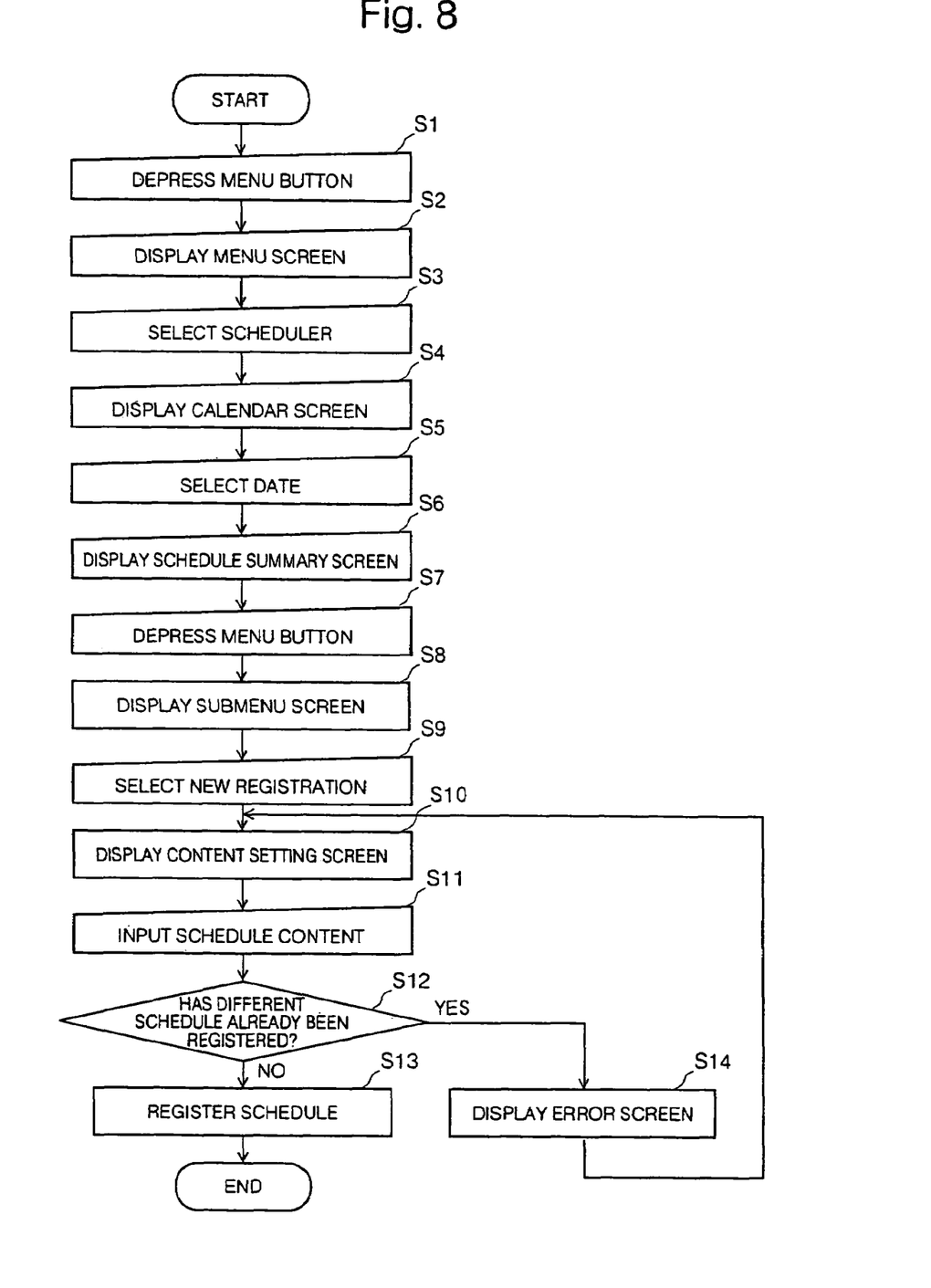
FIG. 8 is a flow chart showing as an example a schedule registration processing performed in the conventional portable telephone.
Figure 9:
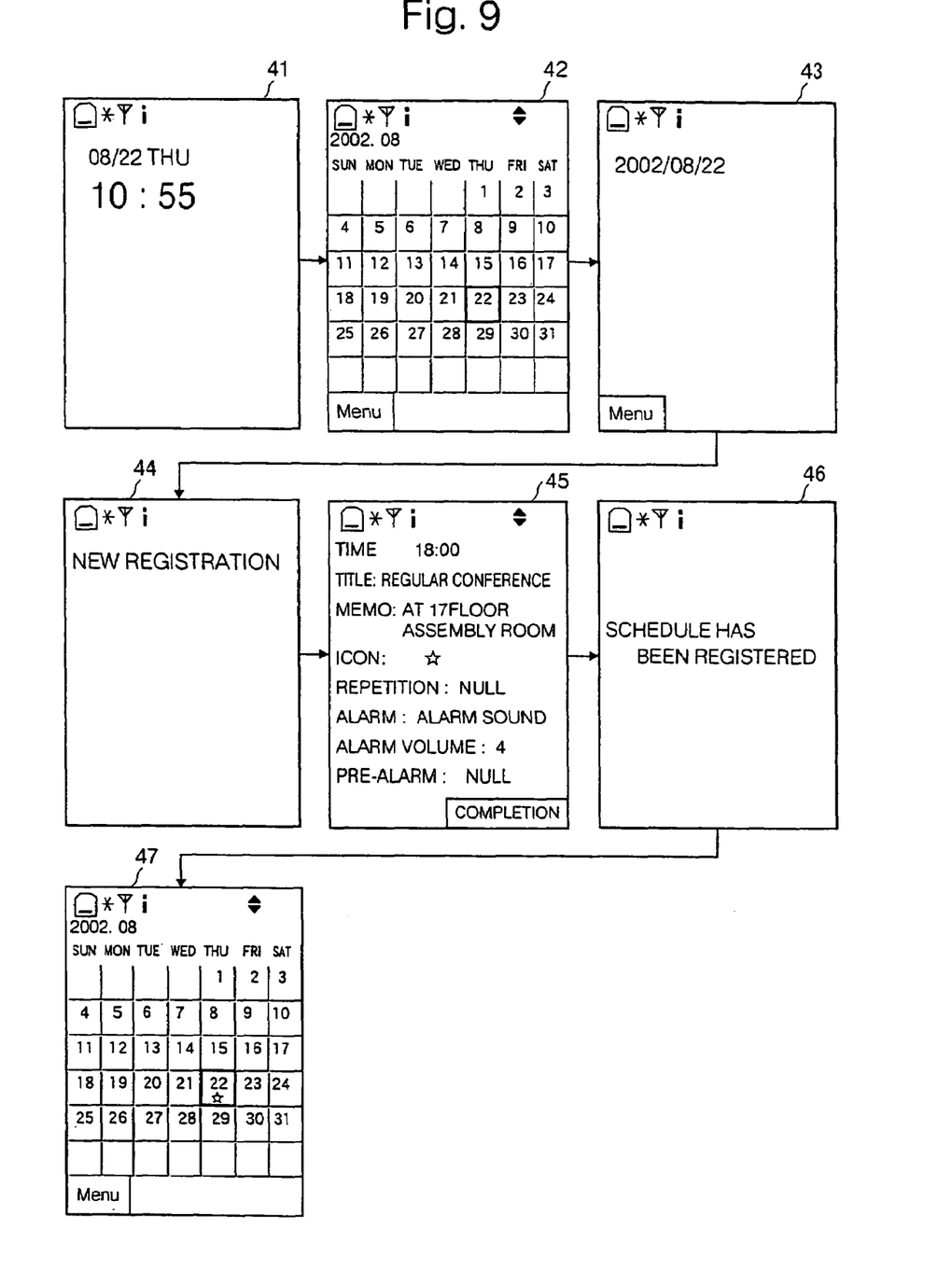
FIG. 9 is a schematic diagram illustrating a series of screens that are to be sequentially transited along with the conventional schedule registration processing.

The following description is provided to explain a conventional schedule registration processing by a schedule management program of the portable telephone. FIG. 8 is a flowchart illustrating an example of the conventional schedule registration processing performed in the portable telephone. FIG. 9 illustrates a series of screens that are to be sequentially transited along with the conventional schedule registration processing.

First of all, Stand-by display 41 is displayed in an initial state of the portable telephone. On the waiting screen 41, if the user depresses the menu button 22 (S1), then the display controlling means 32 performs a display of the menu screen (S2). Subsequently, on the menu screen not shown, if the user selects a "scheduler" by using the cursor buttons 24 and depresses the decision button 23 (S3), then the display controlling means 32 performs a display of a calendar screen 42 (S4).

Next, on the calendar screen 42, if the user selects a date on which he wants to register a schedule by using the cursor buttons 24 and depresses the decision button 23 (S5), the display controlling means 32 performs a display of a schedule summary screen 43 (S6). On an example of the calendar screen 42 as shown in FIG. 9, the date of Aug. 22, 2002 is selected. On the schedule summary screen 43, there is displayed a summary of schedules which have already been registered on selected dates. On an example of the schedule summary screen 43 as shown in FIG. 9, there is no registered schedule on that date (Aug. 22, 2002) and therefore no schedule displayed thereon.

Next, if the user depresses the menu button 22 on the schedule summary screen 43 (S7), the display controlling means 32 performs a display of a submenu screen 44 (S8).

Next, on the submenu screen 44, if the user selects "NEW REGISTRATION" by using the cursor buttons 24 and depresses the decision button 23 (S9), the display controlling means 32 performs a display of a content setting screen 45 (S10). On the content setting screen 45, there are displayed variety of setting items in connection with the schedule to be newly registered. FIG. 9 illustrates an example of the setting items on the content setting screen 45 comprises: a time, a title of schedule; a memo with respect to the schedule; a kind of an icon displayed on the calendar screen; the presence or absence of repetition of an alarm; a kind of an alarm; an alarm volume; and the presence or absence of a pre-alarm.

Next, on the content setting screen 45, the user will sequentially select setting items in connection with the schedule by using the cursor buttons 24 and perform desired inputs to respective setting items by using the dial buttons 25 (S11). As shown in FIG. 9, "18:00" is inputted as the time; a "regular conference" is inputted as the title of schedule; a passage "at 17 floor assembly room" is inputted as the memo in connection with the schedule; an "asterisk" is inputted as the kind of the icon displayed on the calendar screen; a "null" is inputted as the presence or absence of repetition of the alarm; an "alarm sound" is inputted as the kind of the alarm; "4" is inputted as the alarm volume; and a "null" is inputted as the presence or absence of the pre-alarm. After the user has performed inputs to the respective setting items, he will select a "completion" by using the completion button 27 and then depresses the decision button 23, thereby completing the inputting of content of the schedule.

Upon completion of the inputting of the schedule content, the schedule management means 35 decides whether or not a different schedule has already been registered at the same time when the new schedule is to be registered (S12). If the different schedule has already been registered at the same time (S12: YES), then the display controlling means 32 performs a display of a non-shown error screen (S14). This control flow returns to the step 10 (S10) at which the user is prompted on the content setting screen 45 to correct the time to be scheduled.

On the contrary, if the different schedule has not yet been registered at the same time (S12: NO), then the schedule management means 35 registers the schedule content inputted as above (S13). The display controlling means 32 correspondingly performs a display of a registration completion screen 46, thereafter displaying a calendar screen 47 to end this control flow. As a result, on an example of the calendar screen 47 as shown in FIG. 9, the icon "asterisk" which has already been set on the content setting screen 45 is displayed on the date: Aug. 22, 2002 on which the schedule has been registered as above. Thus, the user will be able to confirm the registered schedule.

However, the schedule registration to be pursued by procedures set forth above is a job that must be performed at much expense in time and effort. In the case where schedules having similar contents or schedules to be achieved in the near future must often be registered, the user bothers to register such schedules or otherwise the user tends not to use such a scheduling device.

SUMMARY OF THE INVENTION

In order to solve the above-mentioned problems, an object of the present invention is to provide an information processing device adapted to rapidly register thereinto a schedule, a schedule inputting method for use in the information processing device, and a schedule inputting program used in the information processing device.

According to one aspect of the present invention, there is provided an information processing device for managing an inputted schedule, comprising:

an input portion adapted to receive an input of a numeric value while a waiting screen is being displayed; and a schedule management portion adapted to use the numeric value inputted by said input portion to manage a schedule relating to the numeric value.

With this configuration, a user is able to rapidly register his desired schedule in the information processing device only by inputting a numeric value representative of a time for the schedule. In this configuration, the input portion comprises an input section 12 and an input controlling section 31, the numeric value deciding portion comprises numeric value deciding means 51, and the schedule management portion comprises schedule management means 53, which will be all explained in an embodiment as described below.

Also, the information processing device as mentioned above is characterized in that the numeric value deciding portion is adapted to identify the numeric value as the scheduled time that can be represented by hour and minute if the numeric value is the number with four digits and can be regarded as a value representative of hour and minute.

With this configuration, the user is able to rapidly register his desired schedule only by inputting a numerical value of four digits representative of hour and minute.

Further, the information processing device as mentioned above is characterized in that the numeric value deciding portion is adapted to identify the numeric value as the scheduled time that can be represented by day, hour and minute if the numeric value is the number with six digits and can be regarded as a value representative of day, hour and minute.

With this configuration, the user is able to rapidly register his desired schedule only by inputting a numerical value of six digits representative of day, hour and minute.

Yet further, information processing device as mentioned above is characterized in that the numeric value deciding portion is adapted to identify the numeric value as the scheduled time that can be represented by month, day, hour and minute if the numeric value is the number with eight digits and can be regarded as a value representative of month, day, hour and minute.

With this configuration, the user is able to rapidly register his desired schedule only by inputting a numerical value of eight digits representative of month, day, hour and minute.

Furthermore, the information processing device as mentioned above is characterized in that the numeric value deciding portion is adapted to identify the numeric value as the scheduled time that can be represented by year, month, day, hour and minute if the numeric value is the number with twelve digits and can be regarded as a value representative of year, month, day, hour and minute.

With this configuration, the user is able to rapidly register his desired schedule only by inputting the numeric value of twelve digits representative of year, month, day, hour and minute.

Still furthermore, the information processing device as mentioned above is characterized by further comprising: a timer portion adapted to acquire the current time; and an alarm portion adapted to output an alarm when the current time has reached the scheduled time.

With this configuration, it is possible to notify the user when the scheduled time has been reached. Incidentally, in this configuration, the timer portion comprises timer means 33, the alarm portion comprises any one of a combination of a sound source LSI 8, an audio I/F section 5 and a speaker 6, a LED 9, a vibrator 10, and a display section 11, and an alarm controlling means 34, which will be all explained in an embodiment as described below.

Also, the information processing device as mentioned above is characterized by further comprising:

a timer portion adapted to acquire the current time; and a comparator portion adapted to shift the scheduled time into the future by only a period which is spent until the scheduled time reaches the same time in the future in the case where the scheduled time is represented to be previous to the current time.

With this configuration, the user is able to rapidly and surely register his desired oncoming schedule only by inputting a numeric value having a small number of digits. Incidentally, in this configuration, the comparator portion comprises comparator means 52 which will be explained in an embodiment as described below.

Further, the information processing device as mentioned above is characterized in that the numeric value deciding portion is adapted to identify the numeric value as the scheduled time that can be represented by hour and minute if the numeric value is the number with four digits and can be regarded as a value representative of hour and minute, and the comparator portion is adapted to shift the scheduled time into the future by only one day as a period which can be represented by hour and minute and which is spent until the scheduled time reaches the same time in the future in the case where the scheduled time is represented to be previous to the current time represented by hour and minute.

With this configuration, the user is able to rapidly register his desired schedule from now to one day later only by inputting an appropriate number with four digits as a time.

Yet further, the information processing device as mentioned above is characterized in that the numeric value deciding portion is adapted to identify the numeric value as the scheduled time that can be represented by day, hour and minute if the numeric value is the number with six digits and can be regarded as a value representative of day, hour and minute, and the comparator portion is adapted to shift the scheduled time into the future by only one month as a period which can be represented by day, hour and minute and which is spent until the scheduled time reaches the same time in the future in the case where the scheduled time is represented to be previous to the current time represented by day, hour and minute.

With this configuration, the user is able to rapidly register his desired schedule from now to one month later only by inputting an appropriate number with six digits as a time.

Furthermore, the information processing device as mentioned above is characterized in that the numeric value deciding portion is adapted to identify the numeric value as the scheduled time that can be represented by month, day, hour and minute if the numeric value is the number with eight digits and can be regarded as a value representative of month, day, hour and minute, and the comparator portion is adapted to shift the scheduled time into the future by only one year as a period which can be represented by month, day, hour and minute and which is spent until the scheduled time reaches the same time in the future in the case where the scheduled time is represented to be previous to the current time represented by month, day, hour and minute.

With this configuration, the user is able to rapidly register his desired schedule from now to one year later only by inputting an appropriate number with eight digits as a time.

Still furthermore, the information processing device as mentioned above is characterized by further comprising an alarm portion adapted to output an alarm when the current time has reached the scheduled time.

With this configuration, it is possible to notify the user when the scheduled time has been reached.

Also, the information processing device as mentioned above is characterized in that the information processing device comprises a portable telephone.

With this configuration, it is possible to register a schedule in such a portable telephone by a brief operation.

According to another aspect of the present invention, there is provided a schedule management program for making a computer perform a schedule management, comprising the steps:

a) receiving an input of a numeric value while a waiting screen is being displayed; and b) using the numeric value inputted at the step a) to manage a schedule relating to the numeric value.

With this configuration, the user is able to rapidly and surely register his desired oncoming schedule only by inputting a numeric value having a small number of digits.

According to yet another aspect of the present invention, there is provided schedule management method for performing a schedule management by an information processing device, comprising the steps:

a) receiving an input of a numeric value while a waiting screen is being displayed; and b) using the numeric value inputted at the step a) to manage a schedule relating to the numeric value.

With this configuration, the user is able to rapidly and surely register his desired oncoming schedule only by inputting a numeric value having a small number of digits.

These and other aspects of the present invention will be apparent from the following specific description, given by way of example, with reference to the accompanying drawings.

DETAILED DESCRIPTION OF THE PREFERRED EMBODIMENTS

An information processing device to which the present invention is applied is a device including a CPU and the other pertinent parts and capable of performing a schedule registration. Such a device may comprises: a portable telephone, a PDA (Personal Digital Assistant), a PC (Personal Computer), a notebook computer, a digital camera, a digital video camera, and the like. The portable telephone will be exemplified as the information processing device and described in the following embodiments.

Hereinafter, preferred embodiments of the portable telephone according to the present invention will be described in detail with reference to the accompanying drawings.

Embodiment 1

Figure 3:
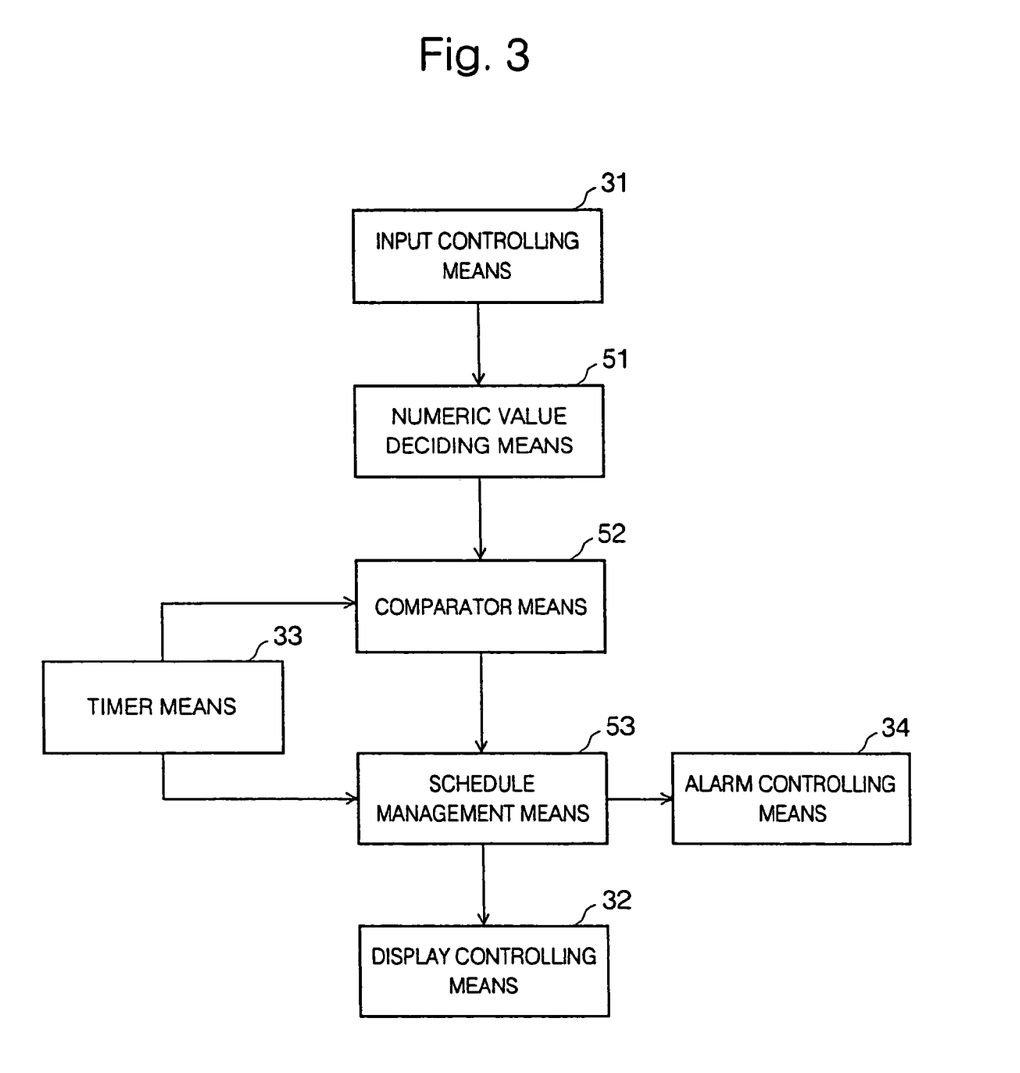
FIG. 3 is a schematic functional block diagram illustrating a schedule management program as an example which is performed in each of portable telephones of first and second embodiments according to the present invention.

The portable telephone of this first embodiment includes an arrangement similar to that as shown in FIG. 1. Its outer appearance is similar to that as shown in FIG. 2. Next, let us consider an example of a schedule management program used in the portable telephone. FIG. 3 is a schematic functional block diagram illustrating the schedule management program used in the portable telephone of this first embodiment according to the present invention. In FIG. 3, like parts similar to those of FIG. 7 are labeled with corresponding numerals and therefore their explanations are omitted.

Timer means 33 outputs the current time to comparator means 52 and a schedule management means 53 as needed. Numeric value deciding means 51 decides whether or not a numeric value obtained from an input controlling means 31 can be appropriate or identified as hour and minute. If the numeric value is decided to be appropriate as hour and minute, the numeric value is outputted to the comparator means 52 as hour and minute for a schedule. The comparator means 52 compares the hour and minute for the schedule obtained from the numeric value deciding means 51 to the current hour and minute acquired from the timer means 33 and then sets year, month and day for the schedule. Subsequently, the comparator means 33 outputs a scheduled time consisting of year, month, day, hour and minute for the schedule to a schedule management means 53.

The schedule management means 53 registers as the schedule both of the scheduled time obtained from the comparator means 52 and a preset default schedule content. Also, the schedule management means 53 outputs an instruction of an alarm to alarm controlling means 34 when an alarm time set for the schedule and the current time acquired from the timer means 33 are equivalent to each other. Further, the schedule management means 53 outputs an instruction of a display of a registration screen, a registered content, and the like to a display controlling means 32.

Figure 4:
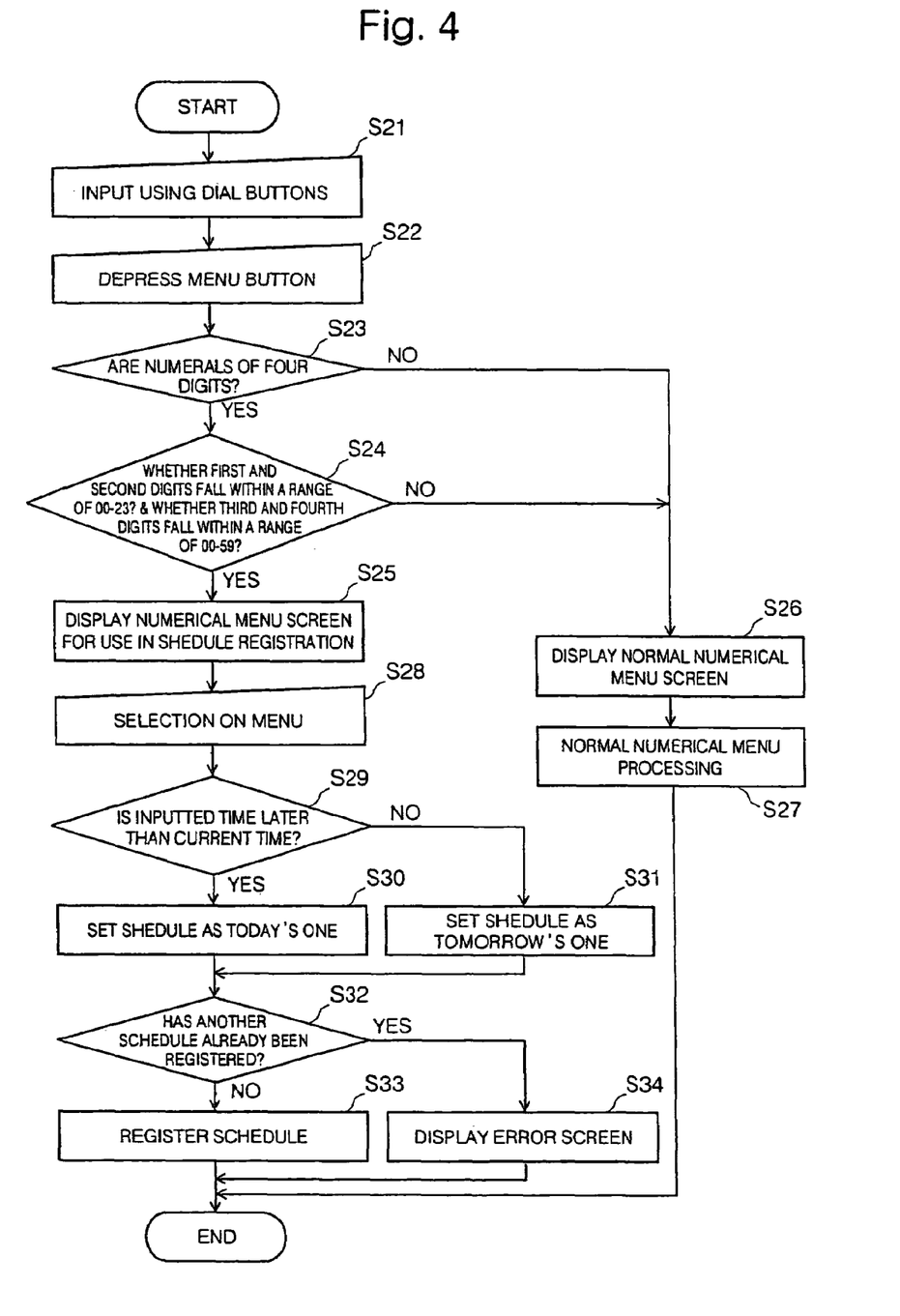
FIG. 4 is a flow chart showing an example of a schedule registration processing performed in the portable telephone of the first embodiment.
Figure 5:
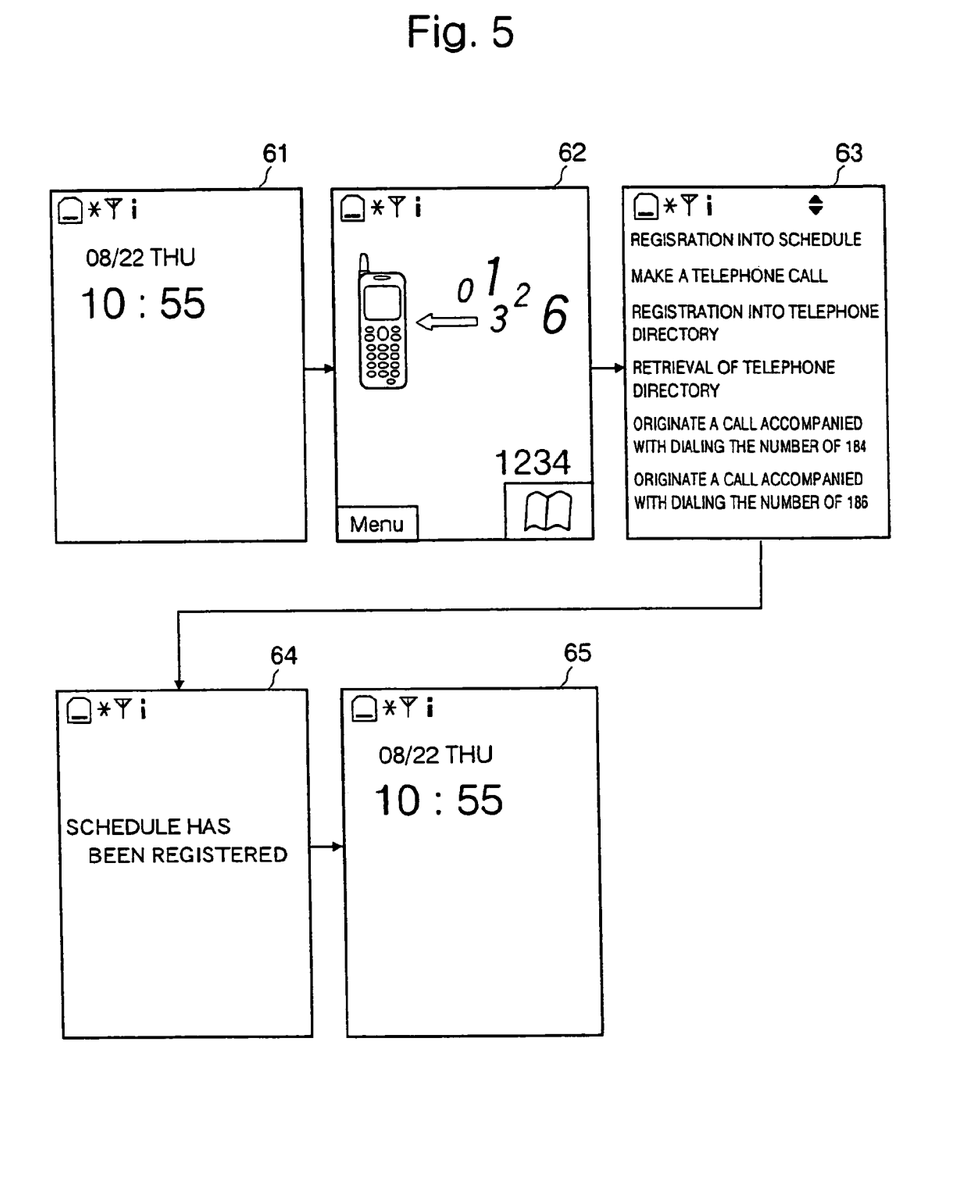
FIG. 5 is a schematic diagram illustrating a series of screens that are to be sequentially transited along with the schedule registration processing.

Next, let us consider a schedule registration processing performed by the schedule management program used in the portable telephone according to this first embodiment. FIG. 4 is a flowchart illustrating an example of the schedule registration processing which will be performed in the portable telephone according to this first embodiment. FIG. 5 is a schematic diagram illustrating a series of screens that are to be sequentially transited along with the schedule registration processing.

First of all, Stand-by display 61 is used in an initial state of the portable telephone. On the waiting screen 61, if a user inputs numerals by using dial buttons 25 (S21) and depresses a menu button 22 (S22), then the numeric value deciding means 51 decides whether or not the inputted numerals constitute a number with four digits (S23). If the inputted numerals do not constitute the number with four digits (S23: NO), then a numerical menu screen appears on the portable telephone (S26) on which a normal numerical menu processing is performed in response to the user's subsequent input (S27). Thereafter, this control flow ends.

This normal numerical menu means a menu without a "REGISRATION INTO SCHEDULE" of a plurality of menu items on the numerical menu screen 63 for the schedule registration.

On the other hand, if the inputted numerals constitute the number with four digits (S23: YES), it is decided whether this numeric value of four digits can be appropriate as hour and minute, i.e., whether the first and second digits fall within a range of 00-23 and whether the third and fourth digits fall a range of 00-59 (S24). If the numeric value of four digits can not be appropriate as hour and minute (S24: NO), then the display controlling means 32 displays the normal numerical menu screen (S26) on which the normal numerical menu processing is performed in response to the user's subsequent input (S27). Thereafter, this control flow ends. On the other hand, if the numeric value can be appropriate as hour and minute (S24: YES), the display controlling means 32 performs a display of the numerical menu screen 63 for the schedule registration (S25). In an example of FIG. 5, a numeral inputting screen 62 displays a numeric value "1234" inputted by the user. The numeric value deciding means 51 decides that the numeric value "1234" is of four digits and that the numeric value can be appropriate as hour and minute.

Next, on the numerical menu screen 63, the user selects the "REGISRATION INTO SCHEDULE" by using cursor buttons 24 and depresses the decision button 23 (S28), then the numeric value deciding means 51 outputs the numeric value of four digits as hour and minute for the schedule to the comparator means 52. The numeric value deciding means 51 as shown in FIG. 5 outputs the numeric value "1234" as "12:34" of scheduled hour and minute to the comparator means 52.

The comparator means 52 decides whether the year, month and day for the schedule is today, i.e., whether the hour and minute for the schedule is later than the current hour and minute (or a numeric value representative of the hour and minute for the schedule is larger than that representative of the current hour and minute) (S29). If the hour and minute for the schedule is later than the current hour and minute (S29: YES), then the comparator means 52 sets the year, month and day for the schedule as today (S30). However, if the hour and minute for the schedule is earlier than (or previous to) the current hour and minute (or a numeric value representative of the hour and minute for the schedule is smaller than that representative of the current hour and minute) (S29, NO), then the comparator means 52 sets the year, month and day for the schedule as tomorrow (S31).

As the example of FIG. 5, assuming that the current time is "Aug. 22, 2002—10:55", the comparator means 52 decides that the hour and minute "12:34" for the schedule is today's schedule because the scheduled hour and minute is later than the current hour and minute "10:55" and then sets "Aug. 22, 2002—12:34" as the scheduled time.

As another example, assuming that the current time is "Aug. 22, 2002—13:00", the comparator means 52 decides that the inputted hour and minute "12:34" for the schedule is tomorrow's schedule because the inputted hour and minute is earlier than (or previous to) the current hour and minute "13:00" and then sets "Aug. 23, 2002—12:34" as the scheduled time.

Next, the schedule management means 53 decides whether the same time as the scheduled time as above has already been registered as a scheduled time for another schedule (S32). If another schedule has already been registered at that same time (S32: YES), then the display controlling means 32 performs a display of the non-shown error screen and thereafter performs a display of Stand-by display 65 (S34), whereafter this control flow ends.

However, if no schedule has already been registered at that same time (S32: NO), then the schedule management means 53 registers the scheduled time set by the comparator means 52 and the default schedule content while the display controlling means 32 performs a display of the waiting screen 65 after a display of a registration completion screen 64 (S33), whereafter this control flow ends. Here, the schedule content consists of items similar to those appeared on the content setting screen 45 as shown in FIG. 9. Also, in an example of the default content, a time is "inputted four-digit number"; a tile of schedule is "quick schedule"; a memo with respect to the schedule is "null"; a kind of an icon displayed on the calendar screen is "asterisk"; the presence or absence of an alarm repetition is "null"; a kind of an alarm is "alarm sound"; an alarm volume is "4"; and the presence or absence of a pre-alarm is "null".

As described above, according to this first embodiment, the numerical menu screen 63 for use in the schedule registration is displayed after numeral input and then the "REGISTRATION INTO SCHEDULE" is selected to activate the schedule registration. However, the present invention is not limited to it. For example, in the event that the numeric value deciding means 51 decides that the inputted numerals can be appropriate as hour and minute, it may be possible to activate the schedule registration without displaying the numerical menu screen 63 for use in the schedule registration after the numeral input. Also, the portable telephone according to this first embodiment, it may be possible to perform the conventional schedule registration as explained above by using FIGS. 8 and 9, in addition to the schedule registration performed by input of the number with four digits according to this first embodiment. Furthermore, it may be possible to change at a later time the schedule content registered as a default according to this first embodiment by a method similar to the conventional schedule registration.

As described above, in accordance with this first embodiment, a time for a schedule can automatically be decided only by the user's input of the number with four digits which are representative of hour and minute, as a result of which the schedule can quickly be registered into the portable telephone together with the default schedule content.

Embodiment 2

In this second embodiment, a schedule registration will be performed with a scheduled time decided by inputting the number with eight digits. The portable telephone of this second embodiment is similar configuration and outer appearance to those of this first embodiment as shown in FIGS. 1 and 2.

Next, a schedule management program used in the portable telephone will be described in detailed. The schedule management program according to this second embodiment is configured with the schematic functional block diagram as shown in FIG. 3, similarly to this first embodiment.

The numeric value deciding means 51 decides whether or not numeric values obtained from the input controlling means 31 can be appropriate or identified as month, day, hour and minute. If the numeric values are decided to be appropriate as month, day, hour and minute, the numeric values are outputted to the comparator means 52 as month, day, hour and minute for a schedule. The comparator means 52 sets year for the schedule by comparing the month, day, hour and minute for the schedule obtained from the numeric value deciding means 51 to the current month, day, hour and minute acquired from the timer means 33 and then outputs a time consisting of the year, month, day, hour and minute for the schedule to the schedule management means 53.

Figure 6:
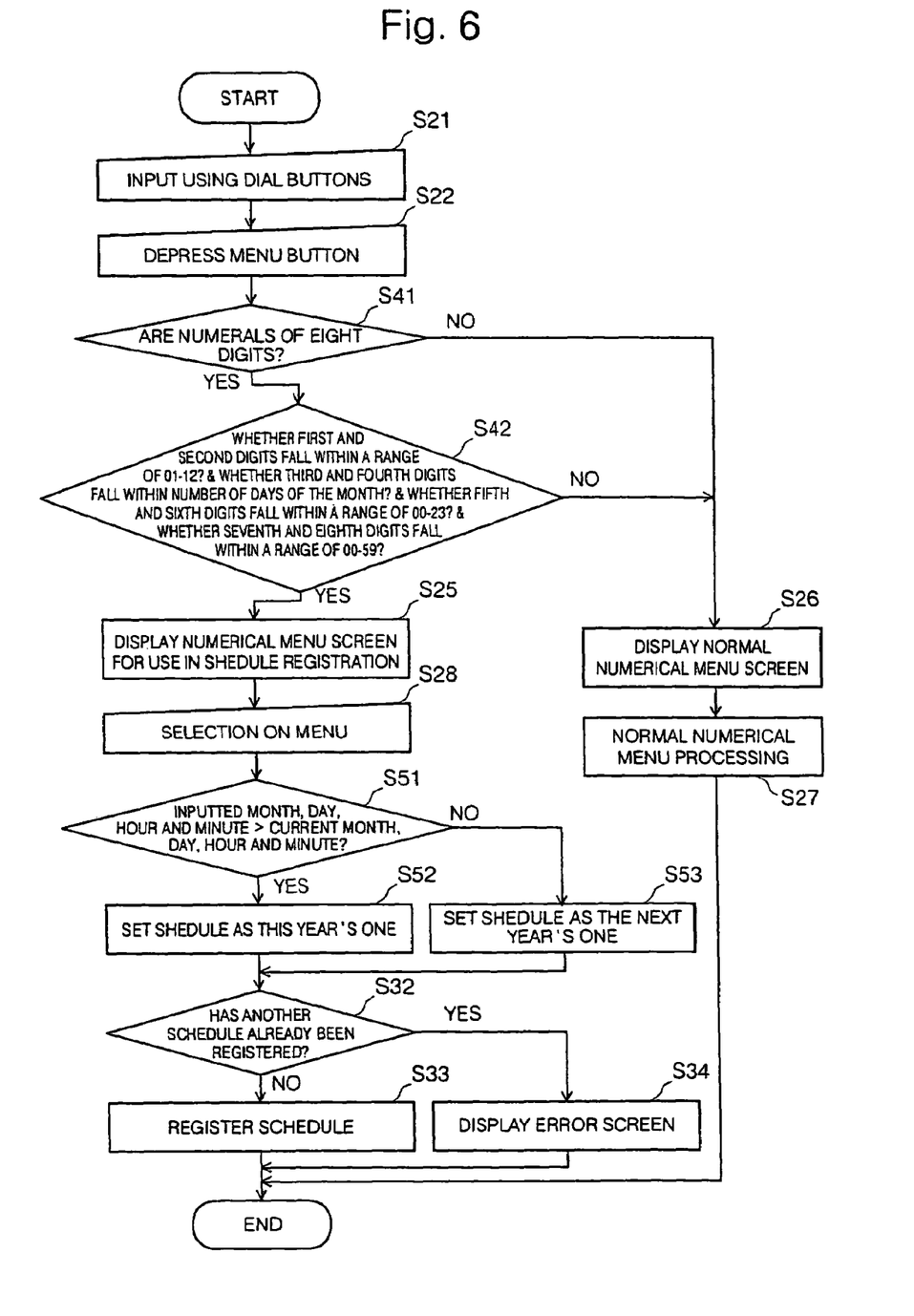
FIG. 6 is a flow chart showing as an example a schedule registration processing performed in the portable telephone of the second embodiment.

Next, let us consider a schedule registration processing performed by the schedule management program used in the portable telephone according to this second embodiment. FIG. 6 is a flowchart illustrating an example of the schedule registration processing which will be performed in the portable telephone according to this second embodiment. In FIG. 6, like processing steps similar to those of FIG. 7 are labeled with corresponding numerals and therefore their explanations are omitted.

On the waiting screen 61, if the user inputs numerals by using dial buttons 25 (S21) and depresses a menu button 22 (S22), then the numeric value deciding means 51 decides whether or not the inputted numerals constitute a number with eight digits (S41). If the inputted numerals do not constitute the number with eight digits (S41: NO), then a numerical menu screen appears on the portable telephone (S26) on which a normal numerical menu processing is performed in response to the user's subsequent input (S27). Thereafter, this control flow ends.

On the other hand, if the inputted numerals constitute the number with eight digits (S41: YES), it is decided whether this numeric value of eight digits can be appropriate as month, day, hour and minute, i.e., whether the first and second digits fall within a range of 01-12, whether the third and fourth digits fall a range of the number of days for the month represented by the first and second digits, whether the fifth and sixth digits fall within a range of 00-23, and whether the seventh and eighth fall within a range 00-59 (S42). If the numeric value of eight digits can not be appropriate as month, day, hour and minute (S42: NO), then the display controlling means 32 displays the normal numerical menu screen (S26) on which the normal numerical menu processing is performed in response to the user's subsequent input (S27). Thereafter, this control flow ends. On the other hand, if the numeric value can be appropriate as month, day, hour and minute (S42: YES), the display controlling means 32 performs a display of the numerical menu screen 63 for the schedule registration (S25).

For example, it is assumed that numerals "08221234" are inputted by the user. The numeric value deciding means 51 decides that the numerals "08221234" are of eight digits and can be appropriate as month, day, hour and minute.

Next, on the numerical menu screen 63 similar to that of FIG. 5, the user selects the "REGISRATION INTO SCHEDULE" by using cursor buttons 24 and depresses the decision button 23 (S28), then the numeric value deciding means 51 outputs this numeric value of eight digits as month, day, hour and minute for the schedule to the comparator means 52. The numeric value deciding means 51 outputs the numeric value "08221234" as "August 22—12:34" of scheduled month, day, hour and minute to the comparator means 52.

The comparator means 52 decides whether the year for the schedule is this year, i.e., whether the month, day, hour and minute for the schedule is later than the current month, day, hour and minute (or a numeric value representative of the month, day, hour and minute for the schedule is larger than that representative of the current month, day, hour and minute) (S51). If the month, day, hour and minute for the schedule is later than the current month, day, hour and minute (S51: YES), then the comparator means 52 sets the year for the schedule as this year (S52). However, if the month, day, hour and minute for the schedule is earlier than (or previous to) the current month, day, hour and minute (or a numeric value representative of the month, day, hour and minute for the schedule is smaller than that representative of the current month, day, hour and minute), then the comparator means 52 sets the year for the schedule as the next year (S53).

Here, assuming that the current time is "Aug. 22, 2002—10:55", the comparator means 52 decides that the month, day, hour and minute: "August 22—12:34" for the schedule is this year's schedule because the scheduled month, day, hour and minute is later than the current hour and minute "August 22—10:55" and then sets "Aug. 22, 2002—12:34" as the scheduled time.

As another example, assuming that the current time is "Aug. 22, 2002—13:00", the comparator means 52 decides that the month, day, hour and minute: "August 22—12:34" for the schedule is the next year's schedule because the scheduled month, day, hour and minute is earlier than (or previous to) the current month, day, hour and minute "August 22—13:00" and then sets "Aug. 22, 2003—12:34" as the scheduled time.

Incidentally, processing steps for deciding whether the schedule according to this second embodiment can be registered are similar to the processing steps S32-S34 in the flow chart as shown in FIG. 4.

As described above, according to this second embodiment, the numerical menu screen 63 for use in the schedule registration is displayed after numeral input and then the "REGISTRATION INTO SCHEDULE" is selected to activate the schedule registration. However, the present invention is not limited to it. For example, in the event that the numeric value deciding means 51 decides that the inputted numerals can be appropriate as month, day, hour and minute, it may be possible to activate the schedule registration without displaying the numerical menu screen 63 for use in the schedule registration after the numeral input. Also, the portable telephone according to this second embodiment, it may be possible to perform the conventional schedule registration as explained above by using FIGS. 8 and 9, in addition to the schedule registration performed by input of the number with eight digits according to this second embodiment. Furthermore, it may be possible to change at a later time the schedule content registered as a default according to this second embodiment by a method similar to the conventional schedule registration.

Also, as described above, in accordance with this second embodiment, a time for a schedule can automatically be decided only by the user's input of the number with eight digits which are representative of month, day, hour and minute, as a result of which the schedule can quickly be registered into the portable telephone together with the default schedule content.

Further, the schedule registration performed by inputting the number with four digits has been described in the first embodiment while the schedule registration performed by inputting the number with eight digits has been described in the second embodiment. However, in accordance with the present invention, it is possible to perform the schedule registration by inputting the number with six digits. Specifically, after the user has inputted that number having first and second digits representative of day, third and fourth digits representative of hour, and fifth and sixth digits representative of minute, the numeric value deciding means 51 decides that the inputted numerals can be appropriate as day, hour and minute. If it has been decided to be appropriate, the numeric value deciding means 51 outputs the numeric value as day, hour and minute for the schedule to the comparator means 52. The comparator means 52 decides whether the year and month for the schedule is this month, i.e., whether the day, hour and minute for the schedule is later than the current day, hour and minute (or a numeric value representative of the day, hour and minute for the schedule is larger than that representative of the current day, hour and minute). If the day, hour and minute for the schedule is later than the current day, hour and minute, then the comparator means 52 sets the year and month for the schedule as this month. However, if the day, hour and minute for the schedule is earlier than (or previous to) the current day, hour and minute (or a numeric value representative of the day, hour and minute for the schedule is smaller than that representative of the current day, hour and minute), then the comparator means 52 sets the year and month for the schedule as the next month.

Furthermore, in accordance with the present invention, it is possible to perform the schedule registration by inputting the number with twelve digits. Specifically, after the user has inputted that number, as any year, month, day, hour and minute, having first through fourth digits representative of year, fifth and sixth digits representative of month, seventh and eighth digits representative of day, ninth and tenth digits representative hour and eleventh and twelfth digits representative of minute, the numeric value deciding means 51 decides whether the inputted numerals of twelve digits can be appropriate or identified as year, month, day, hour and minute. If it has been decided to be appropriate, the numeric value deciding means 51 decides the numeric value to be the year, month, day, hour and minute for the schedule. In this case, the comparator means 52 is not used.

According to the present invention, the user can rapidly perform a schedule registration by only inputting appropriate numerals as a time for a schedule because the time will automatically be decided as the scheduled time and a default schedule content will be registered together with the scheduled time.

While preferred exemplary embodiments of the present invention have been described above, it is to be understood that further adaptations of the invention described herein can be obtained by appropriate modifications by one of ordinary skill in the art without departing from the scope of the present invention. Accordingly, although preferred configurations of devices, methods, and programs embodying the present invention have been described, it should be understood that these devices, methods, and programs may take on a wide variety of configurations and arrangements without departing from the scope of the present invention. Therefore, the scope of the present invention should be considered in terms of the following claims and should not be limited to the details of the devices, methods, and programs shown and described above.

What is claimed is:

1. An information processing device, comprising:
an input portion to receive an input of a numeric value while a stand-by screen is still being displayed; and
a schedule management portion to use the numeric value inputted by said input portion to manage a schedule relating to the numeric value.

2. The information processing device as claimed in claim 1, further comprising a function displaying portion to display a plurality of functions for selecting any one of functions when the numeric value is inputted by said input portion,
wherein said schedule management portion is for managing a schedule for the function selected by using said function displaying portion.

3. The information processing device as claimed in claim 1 or 2, further comprising a numeric value deciding portion to decide a digit number and a range of the numeric value inputted by said input portion,     wherein said schedule management portion is for managing a schedule relating to the numeric value based on a numeric value deciding result from said numeric value deciding portion.

4. The information processing device as claimed in claim 3, wherein said numeric value deciding portion is to identify the numeric value as the scheduled time that can be represented by hour and minute if the numeric value is the number with four digits and can be regarded as a value representative of hour and minute.

5. The information processing device as claimed in claim 3, wherein said numeric value deciding portion is to identify the numeric value as the scheduled time that can be represented by day, hour and minute if the numeric value is the number with six digits and can be regarded as a value representative of day, hour and minute.

6. The information processing device as claimed in claim 3, wherein said numeric value deciding portion is to identify the numeric value as the scheduled time that can be represented by month, day, hour and minute if the numeric value is the number with eight digits and can be regarded as a value representative of month, day, hour and minute.

7. The information processing device as claimed in claim 1, further comprising:

a timer portion to acquire the current time; and a comparator portion to shift the scheduled time into the future by only a period which is spent until the scheduled time reaches the same time in the future in the case where the scheduled time is represented to be previous to the current time.

8. The information processing device as claimed in claim 7, wherein said numeric value deciding portion is to identify the numeric value as the scheduled time that can be represented by hour and minute if the numeric value is the number with four digits and can be regarded as a value representative of hour and minute; and     wherein said comparator portion is to shift the scheduled time into the future by only one day as a period which can be represented by hour and minute and which is spent until the schedule time reaches the same time in the future in the case where the scheduled time is represented to be previous to the current time represented by hour and minute.

9. The information processing device as claimed in claim 7, wherein said numeric value deciding portion is to identify the numeric value as the scheduled time that can be represented by day, hour and minute if the numeric value is the number with six digits and can be regarded as a value representative of day, hour and minute; and     wherein said comparator portion is to shift the scheduled time into the future by only one month as a period which can be represented by day, hour and minute and which is spent until the scheduled time reaches the same time in the future in the case where the scheduled time is represented to be previous to the current time represented by day, hour and minute.

10. The information processing device as claimed in claim 7, wherein the schedule managed by said schedule management portion includes an alarming time.

11. The information processing device as claimed in claim 7, wherein the schedule managed by said schedule management portion include an agenda.

12. The information processing device as claimed in claim 7, further comprising an alarm portion to output an alarm when the current time acquired by said timer portion has reached the scheduled time.

13. A schedule management program stored on a computer readable medium for making a computer perform a schedule management, comprising the steps of:

a) receiving, by the computer, an input of a numeric value while a stand-by screen is still being displayed; and     b) using the numeric value inputted at the step a) to manage a schedule relating to the numeric value.

14. The schedule management program as claimed in claim 13, further comprising the step c) of displaying a plurality of functions for selecting any one of functions when the numeric value is inputted at the step a),     wherein a schedule for the function selected at the step c) is managed at the step b).

15. A schedule management method for performing a schedule management by an information processing device, comprising the steps:

a) receiving an input of a numeric value while a stand-by screen is still being displayed; and     b) using the numeric value inputted at the step a) to manage a schedule relating to the numeric value.

16. The schedule management method as claimed in claim 15, further comprising the step c) of displaying a plurality of functions for selecting any one of functions when the numeric value is inputted at the step a),     wherein a schedule for the function selected at the step c) is managed at the step b).

17. An information processing device, comprising:

a processing unit;

numeric keys used to input numeric value;

a display at least displaying information concerning process by the processing unit, and information input through the numeric keys; and a memory unit storing schedule data;

wherein the processing unit accepts input of numeric value through the numeric keys while a standby screen still displayed on the display unit, determines a number of digits of the input numeric value inputted while the standby screen is displayed, when a menu screen is displayed on the display unit, and registers the input numeric value as a schedule data when it is determined that the number of digits of the input numeric value meets a predetermined condition, when a numerical menu screen is displayed on the display unit.

18. An information processing device, comprising:

a processing unit;

numeric keys used to input numeric value;

a display at least displaying information concerning process by the processing unit, and information input through the numeric keys; and a memory unit storing schedule data;

wherein the processing unit accepts input of numeric value through the numeric keys while a standby screen is still displayed on the display unit, displays a menu screen including an item for selecting a registration of a schedule on the display unit, and registers the input numeric value as a schedule data, when the item for selecting a registration of a schedule is selected from said menu screen, and it is determined that a number of digits of the input numeric value inputted while the standby screen is still displayed equals to a predetermined number, when a numerical menu screen is displayed on the display unit.

19. An information processing device, comprising:

a processing unit;

numeric keys used to input numeric value;

a display at least displaying information concerning process by the processing unit, and information input through the numeric keys; and a memory unit storing schedule data;

wherein the processing unit accepts input of numeric value through the numeric keys while a standby screen is still displayed on the display unit, displays a menu screen including an item for selecting a registration of a schedule on the display unit, and registers the input numeric value as a schedule data, when the item for selecting a registration of a schedule is selected from said menu screen, when a numerical menu screen is displayed on the display unit.

20. A method for registering schedule data, comprising the steps of:

accepting input of numeric value while a standby screen is still displayed on the display unit;

determining a number of digits of the numeric value; and registering the numeric value as a schedule data when it is determined that the number of digits of the numeric value equals to a predetermined number, when a numerical menu screen is displayed on the display unit.

21. A method for registering schedule data, comprising the steps of:

accepting input of numeric value while a standby screen is still displayed on the display unit;

determining a number of digits of the numeric value when a key for selecting a menu screen is operated; and registering the numeric value as a schedule data when it is determined that the number of digits of the numeric value equals to a predetermined number, and a registration of the schedule data is selected through the menu screen, when a numerical menu screen is displayed on the display unit.

* * * * *

UNITED STATES PATENT AND TRADEMARK OFFICE
CERTIFICATE OF CORRECTION

| | |
|---|---|
| PATENT NO. | : 7,457,642 B2 |
| APPLICATION NO. | : 11/444327 |
| DATED | : November 25, 2008 |
| INVENTOR(S) | : Yuko Kamata et al. |

Page 1 of 1

It is certified that error appears in the above-identified patent and that said Letters Patent is hereby corrected as shown below:

Column 14, Line 39, after "screen" insert --is--.

Signed and Sealed this

Twenty-fourth Day of February, 2009

JOHN DOLL
*Acting Director of the United States Patent and Trademark Office*